US008852816B2

(12) United States Patent
Ogasa (10) Patent No.: US 8,852,816 B2
(45) Date of Patent: Oct. 7, 2014

(54) ALL-SOLID SECONDARY BATTERY (75) Inventor: Kazuhito Ogasa, Kanagawa (JP)

(73) Assignee: Ohara Inc., Kanagawa (JP)

( * ) Notice: Subject to any disclaimer, the term of this patent is extended or adjusted under 35 U.S.C. 154(b) by 0 days.

(21) Appl. No.: 13/421,086

(22) Filed: Mar. 15, 2012

(65) Prior Publication Data

US 2012/0237834 A1 Sep. 20, 2012

(30) Foreign Application Priority Data

Mar. 15, 2011 (JP) ................. 2011-057142

(51) Int. Cl.
H01M 10/0562 (2010.01)
H01M 6/04 (2006.01)
H01M 10/0525 (2010.01)

(52) U.S. Cl.
CPC .......... *H01M 10/0525* (2013.01); *Y02E 60/122* (2013.01); *H01M 2300/0071* (2013.01); *H01M 2300/0068* (2013.01); *H01M 2300/0091* (2013.01); *H01M 10/0562* (2013.01)
USPC ............ 429/322; 429/321; 429/304; 429/188

(58) Field of Classification Search
None
See application file for complete search history.

(56) References Cited

U.S. PATENT DOCUMENTS

2009/0197178 A1* 8/2009 Inda .................. 429/231.95

FOREIGN PATENT DOCUMENTS

| JP | 2007-5279 A | | 1/2007 | | |
|----|----|----|----|----|----|
| JP | 2009-181882 | * | 8/2009 | ............ | H01M 10/36 |
| JP | 2009-193857 | * | 8/2009 | ............ | H01B 13/00 |
| JP | 2009-224318 A | | 10/2009 | | |
| JP | 2010-275130 A | | 12/2010 | | |
| WO | 2007/004590 A1 | | 1/2007 | | |

OTHER PUBLICATIONS

English translation of JP 2009-193857.*
English translation of JP 2009-181882.*
Money et al., Lithium Ion Conduction in Lithium Metaphosphate Based Systems, 647-652 Appl. Phys. A 88 (2007).*

* cited by examiner

*Primary Examiner* — Yoshitoshi Takeuchi
(74) *Attorney, Agent, or Firm* — Hoffmann & Baron, LLP (57) ABSTRACT In the all-solid secondary battery of the present invention, a positive electrode layer and a negative electrode layer are disposed on both sides of a solid electrolyte layer, a first inorganic solid electrolyte and a second inorganic solid electrolyte are included into at least one of the positive electrode layer, the negative electrode layer, and the solid electrolyte layer, the content of transition metal in the first inorganic solid electrolyte is less than 15% by mass on oxide basis, and the content of transition metal in the second inorganic solid electrolyte is 15% by mass or more on oxide basis.

8 Claims, 3 Drawing Sheets

EXAMPLE 4

FIG. 3B

COMPARATIVE EXAMPLE 7

ALL-SOLID SECONDARY BATTERY

This application is based on and claims the benefit of priority from Japanese Patent Application No. 2011-057142, filed on 15 Mar. 2011, the content of which is incorporated herein by reference.

BACKGROUND OF THE INVENTION

1. Field of the Invention

The present invention relates to an all-solid secondary battery, in particular to an all-solid lithium ion secondary battery and a method of manufacturing the all-solid lithium ion secondary battery.

2. Related Art

All-solid batteries, using an inorganic solid electrolyte and not using organic substance even in electrodes, are free from worries about leakage of organic electrolyte or gas generated from organic electrolyte, and therefore are expected to be safe batteries. Furthermore, the all-solid batteries are less likely to induce a side reaction other than battery reactions compared to liquid batteries, and therefore are expected to have a longer operating life compared to liquid batteries.

In an example of the all-solid batteries, a positive electrode layer and a negative electrode layer are respectively laminated and sintered on both sides of a solid electrolyte layer. In the all-solid batteries, constituent particles between or within the layers can be physically connected by sintering. However, in this case, there arises a problem that ion conduction resistance increases since a substance other than active materials or solid electrolytes generates during sintering at a sintered interface of electrode active materials and the solid electrolyte. Consequently, Patent Document 1 discloses that an uncalcined body of solid electrolyte layer composed of a solid electrolyte and an uncalcined body of electrode layer are laminated and these are calcined simultaneously for the purpose of forming a sintered body used for an inorganic solid electrolyte, for example. Here, Patent Document 1 also discloses that sintering of crystalline solid electrolyte or electrode active material is promoted by adding a glass body with a softening temperature of 700° C. or higher into at least a solid electrolyte layer or an electrode layer.

Furthermore, Patent Document 2 discloses an all-solid battery using a positive electrode which is composed of a solid electrode based on sulfide and a positive electrode active material coated with a lithium ion conductive oxide.

Furthermore, Patent Document 3 discloses a method in which when a solid electrolyte composed of a crystallized glass formed with a NASICON-type main crystal is prepared, connection is made with an electrode under a pre-crystallized glass condition and then crystallizing is performed.

Furthermore, Patent Document 4 discloses a glass which is obtained through ion exchange and has lithium ion conductivity.

[Patent Document 1] Japanese Unexamined Patent Application, Publication No. 2007-005279

[Patent Document 2] PCT International Application, Publication No. 2007/004590 Pamphlet

[Patent Document 3] Japanese Unexamined Patent Application, Publication No. 2009-224318

[Patent Document 4] Japanese Unexamined Patent Application, Publication No. 2010-275130

SUMMARY OF THE INVENTION

In the method disclosed in Patent Document 1, it is expected that a sintered body of the electrode and the solid electrolyte is formed as well as the interface thereof is well joined by calcining the solid electrolyte layer and the electrode layer at the same time. It is also expected in this method that total production cost of solid batteries can be lowered since production steps are decreased. However, even if the interfaces of particles forming the solid electrolyte layer and the electrode layer are well connected, charge-discharge behavior thereof is poor since ion conduction resistance at the interfaces is still large. Furthermore, it is not envisaged that a third phase other than solid electrolytes and electrode active materials is employed.

From this aspect, in recent years, preparation of electrode layers has been investigated in which a powder of conductive additive is mixed and sintered in addition to electrode active materials and solid electrolytes in order to enhance electron conductivity in the electrode layers. Here, in a case of mixing a powder of conductive additive, it is necessary that an electron conduction path from a current collector to an electrode active material is formed by the conductive additive; on the other hand, it is also necessary that an ion conduction path from the electrode active material to a solid electrolyte layer is formed. However, it is difficult to sufficiently form the three-layer interface consisting of the electrode active material, the solid electrolyte layer, and the conductive additive.

Additionally, in the all-solid battery disclosed in Patent Document 2, there is a problem in safety to be an advantage of the all-solid battery since there is a risk to generate a harmful gas due to decomposition of the sulfide in the solid electrolyte.

Additionally, in the method disclosed in Patent Document 1, treatment at high temperatures is absolutely necessary in order to progress sintering since the softening temperature of the glass body added to the solid electrolyte layer or electrode layer is as high as 700° C. or higher. In the method disclosed in Patent Document 3 also, treatment at high temperatures is necessary for crystallizing the glass. In the glass disclosed in Patent Document 4 also, treatment at high temperatures is necessary for softening the glass since the glass transition temperature is as high as 550° C. or higher. Here, when the treatment at high temperatures is carried out, it becomes difficult to form the electrode layer in particular since the electrode active materials of oxide type tend to decompose.

Furthermore, the glass disclosed in Patent Document 4 is insufficient in terms of ion conductivity.

The present invention has been made in view of the problems described above; and it is an object of the present invention to provide an all-solid secondary battery in which an ion conductive path and an electron conduction path from electron active materials are well formed, ion conduction resistance between the particles of active materials or solid electrolytes is reduced, and battery capacity or charge-discharge behavior is high, and a manufacturing method thereof.

It is also an object of the present invention to provide an all-solid secondary battery with high safety while having a high battery capacity and charge-discharge behavior, and a manufacturing method thereof.

It is also an object of the present invention to provide an all-solid secondary battery allowing formation of a solid electrolyte layer or an electrode layer at lower temperatures, and a manufacturing method thereof.

The present inventors have found that when heating for forming an all-solid secondary battery is performed, a first inorganic solid electrolyte is likely to enter into voids formed by a solid phase of a second inorganic solid electrolyte etc. due to softening of the first inorganic solid electrolyte while a skeleton of the all-solid secondary battery is formed by the second inorganic solid electrolyte by virtue of incorporating the first inorganic solid electrolyte with a small content of transition metal and the second inorganic solid electrolyte with a large content of transition metal into the all-solid secondary battery, thereby completing the present invention.

In a first aspect, there is provided an all-solid secondary battery, in which a positive electrode layer and a negative electrode layer are disposed on both sides of a solid electrolyte layer, at least one of the positive electrode layer, the negative electrode layer, and the solid electrolyte layer contains a first inorganic solid electrolyte and a second inorganic solid electrolyte, the content of transition metal in the first inorganic solid electrolyte is less than 15% by mass on oxide basis, and the content of transition metal in the second inorganic solid electrolyte is 15% by mass or more on oxide basis.

According to a second aspect of the present invention, in the all-solid secondary battery according to the first aspect, the first inorganic solid electrolyte contains the following components in terms of mass percent on oxide basis:

$R_2O$ 12~45%
$SiO_2$ 0~75%
$P_2O_5$ 0~83%
$AO_2$ 0~10%
$M_2O_3$ 0~20% in which, R is at least one selected from Li and Na; A is at least one selected from Zr, Ti, and Ge; and M is at least one selected from B, Al, Bi, La, Y, and Sc.

According to a third aspect of the present invention, in the all-solid secondary battery according to the first or second aspect, the second inorganic solid electrolyte contains the following components in terms of mass percent on oxide basis:

$R_2O$ 3~20%
$SiO_2$ 0~10%
$P_2O_5$ 0~60%
$AO_2$ 15~35%
$M_2O_3$ 0~60% in which, R is at least one selected from Li and Na; A is at least one selected from Zr, Ti, and Ge; and M is at least one selected from B, Al, Bi, La, Y, and Sc.

According to a fourth aspect of the present invention, in the all-solid secondary battery according to any one of the first to third aspects, the second inorganic solid electrolyte has a crystalline layer of NASICON-type, $\beta$-$Fe_2(SO_4)_3$-type, garnet-type, or perovskite-type.

According to a fifth aspect of the present invention, in the all-solid secondary battery according to any one of the first to fourth aspects, the content of the first inorganic solid electrolyte is 0.5% to 15% in terms of mass percent in the solid electrolyte layer.

According to a sixth aspect of the present invention, in the all-solid secondary battery according to any one of the first to fifth aspects, the negative electrode layer contains the first inorganic solid electrolyte, the second inorganic solid electrolyte, a negative electrode active material, and a conductive additive, and the content of the first inorganic solid electrolyte is 1% to 15% in terms of mass percent.

According to a seventh aspect of the present invention, in the all-solid secondary battery according to any one of the first to sixth aspects, the positive electrode layer contains the first inorganic solid electrolyte, the second inorganic solid electrolyte, a positive electrode active material, and a conductive additive, and the content of the first inorganic solid electrolyte is 1% to 15% in terms of mass percent.

According to an eighth aspect of the present invention, in the all-solid secondary battery according to any one of the first to seventh aspects, the first inorganic solid electrolyte is composed of a composition same as that of a glass with a Tg of 250° C. or higher and 650° C. or lower.

According to a ninth aspect of the present invention, in the all-solid secondary battery according to any one of the first to eighth aspects, the first inorganic solid electrolyte is $LiPO_3$.

According to a tenth aspect of the present invention, in the all-solid secondary battery according to any one of the first to ninth aspects, the positive electrode active material in the positive electrode layer is composed of $LiMtO_2$ and/or $LiMt_2O_4$, in which, Mt is at least one selected from Fe, Ni, Co, and Mn.

According to an eleventh aspect of the present invention, in the all-solid secondary battery according to any one of the first to tenth aspects, the negative electrode active material in the negative electrode layer is composed of $Li_4Ti_5O_{12}$ and/or $TiO_2$.

In a twelfth aspect, a method of manufacturing an all-solid secondary battery includes: a mixing step in which an amorphous powder of a first inorganic solid electrolyte and a crystalline powder of a second inorganic solid electrolyte are mixed to prepare a raw material composition, and a heat treatment step in which the raw material composition is heated to soften the powder of the first inorganic solid electrolyte.

According to a thirteenth aspect of the present invention, in the method of manufacturing an all-solid secondary battery according to the twelfth aspect, the content of transition metal in the first inorganic solid electrolyte is less than 15% by mass on oxide basis, and the content of transition metal in the second inorganic solid electrolyte is 15% by mass or more on oxide basis.

According to a fourteenth aspect of the present invention, in the method of manufacturing an all-solid secondary battery according to the twelfth or thirteenth aspect, the heat treatment step is performed at a temperature higher than Tg of the first inorganic solid electrolyte.

According to a fifteenth aspect of the present invention, in the method of manufacturing an all-solid secondary battery according to any one of the twelfth to fourteenth aspects, a molding step to mold the raw material composition into a compact with a desired shape is further included, and the compact composed of the raw material composition is heated in the heat treatment step.

According to a sixteenth aspect of the present invention, in the method of manufacturing an all-solid secondary battery according to the fifteenth aspect, the raw material composition is shaped in the molding step.

In accordance with the present invention, there may be provided the all-solid secondary battery in which an ion conductive path and an electron conduction path from electron active material are well formed, ion conduction resistance between the particles of the active material or the solid electrolyte is reduced, and battery capacity or charge-discharge behavior is high, and the manufacturing method thereof.

Furthermore, in accordance with the present invention, generation of harmful gas caused by decomposition of the second inorganic solid electrolyte is reduced by virtue of including the second inorganic solid electrolyte composed of oxide in particular. Accordingly, the all-solid secondary battery with high safety while having a high battery capacity and charge-discharge behavior, and a manufacturing method thereof can be provided.

Furthermore, in accordance with the present invention, the all-solid secondary battery able to be formed by heating even at lower temperatures can be provided since the first inorganic solid electrolyte may be formed using a glass phase which is easily softened by heating by virtue of allowing to include the first inorganic solid electrolyte with a less content of transition metal components in particular.

DETAILED DESCRIPTION OF THE INVENTION

In the all-solid secondary battery of the present invention, a positive electrode layer and a negative electrode layer are disposed on both sides of a solid electrolyte layer, a first inorganic solid electrolyte and a second inorganic solid electrolyte are included into at least one of the positive electrode layer, the negative electrode layer, and the solid electrolyte layer, the content of transition metal in the first inorganic solid electrolyte is less than 15% by mass on oxide basis, and the content of transition metal in the second inorganic solid electrolyte is 15% by mass or more on oxide basis.

Here, the first inorganic solid electrolyte with a small content of transition metal is likely to form a glass phase and thus tends to soften by heating. On the other hand, the second inorganic solid electrolyte with a large content of transition metal is likely to form a crystalline phase and thus unlikely to soften by heating. The first inorganic solid electrolyte is likely to enter into voids formed by a solid phase of the second inorganic solid electrolyte etc. due to softening of the first inorganic solid electrolyte while a skeleton of the all-solid secondary battery is formed by the second inorganic solid electrolyte, when heating for forming the all-solid secondary battery is performed, by virtue of including the first inorganic solid electrolyte and the second inorganic solid electrolyte into at least one of the positive electrode layer, the negative electrode layer, and the solid electrolyte layer. That is, while an intended lithium ion conduction path is assured by the second inorganic solid electrolyte, the first inorganic solid electrolyte enters between a second inorganic solid electrolyte and another second inorganic solid electrolyte, and contact condition between the second inorganic solid electrolyte and the first inorganic solid electrolyte may be enhanced. At the same time, phase separation between solid electrolytes and other solid phases may be reduced. Accordingly, an effect to increase the battery capacity or charge-discharge behavior of the all-solid secondary battery may be induced by virtue of increasing a lithium ion conduction efficiency through the ion conduction path and forming more uniformly the solid electrolyte layer and the electrode layer of the all-solid secondary battery.

In addition, the method of manufacturing an all-solid secondary battery includes a mixing step in which an amorphous powder of the first inorganic solid electrolyte and a crystalline powder of the second inorganic solid electrolyte are mixed to prepare a raw material composition and a heat treatment step in which the raw material composition is heated to soften the powder of the first inorganic solid electrolyte. Thereby, the voids formed by solid phases of the second inorganic solid electrolyte, etc. are embedded by the softened first inorganic solid electrolyte by virtue of softening of the powder of the first inorganic solid electrolyte at the heat treatment step. At the same time, the skeleton of the voids is maintained by virtue of not softening the powder of the second inorganic solid electrolyte. Therefore, when other solid phases, e.g. electrode active materials and conductive additives, are included, phase separation of them may be reduced and the lithium ion conduction path may be assured.

Hereinafter, embodiments of the all-solid secondary battery of the present invention and the manufacturing method thereof are explained in detail. The present invention is not limited to the embodiments below and may be carried out with appropriately making a change within the scope of the invention. In addition, repeated explanations are occasionally omitted as appropriate, which does not limit the scope of the invention.

The contents of components in the first inorganic solid electrolyte and the second inorganic solid electrolyte of the all-solid secondary battery of the present invention are expressed in terms of mass percent on oxide basis unless indicated otherwise. Here, "composition on oxide basis" refers to a composition of components in a solid electrolyte assuming that oxides, complex salts, metal fluorides, etc. used as raw materials of the solid electrolyte are entirely decomposed into oxides and the total mass of the generated oxides corresponds to 100% by mass.

[All-Solid Secondary Battery]

The all-solid secondary battery of the present invention has the solid electrolyte layer, the positive electrode layer, and the negative electrode layer, and the first inorganic solid electrolyte and the second inorganic solid electrolyte are included into at least one of the positive electrode layer, the negative electrode layer, and the solid electrolyte layer.

Solid Electrolyte Layer

The solid electrolyte layer of this embodiment encompasses the first inorganic solid electrolyte and the second inorganic solid electrolyte. Thereby, the ratio of the surface area of the second inorganic solid electrolyte adjacent to the first inorganic solid electrolyte or the second inorganic solid electrolyte is increased. For this reason, the lithium ion conduction efficiency in the solid electrolyte layer may be further increased.

(First Inorganic Solid Electrolyte)

Here, the content of transition metal in the first inorganic solid electrolyte is less than 15% by mass on oxide basis. Thereby, the first inorganic solid electrolyte is likely to exist in a glass state, thus the first inorganic solid electrolyte may be easily softened at lower temperatures when the all-solid secondary battery is heated. The "transition metal component" in the present invention may encompass Ge, Sn, and Pb among 14th group elements in addition to 3rd to 11th group elements of typical transition metals. Among these, at least one selected from Zr, Ti, and Ge is more preferable. By reducing these elements, glass is likely to form in the first inorganic solid electrolyte and also crystal is unlikely to generate, thus the first inorganic solid electrolyte may be easily softened by heating.

More preferably, the first inorganic solid electrolyte contains 12 to 45% of $R_2O$, and the content of $SiO_2$ is 0 to 75%, the content of $P_2O_5$ is 0 to 83%, the content of $AO_2$ is 0 to 10%, and the content of $M_2O_3$ is 0 to 20%, in terms of mass percent on oxide basis. Here, R is at least one selected from Li and Na; A is at least one selected from Zr, Ti, and Ge; and M is at least one selected from B, Al, Bi, La, Y, and Sc. Thereby, the content of $AO_2$ is decreased, thus stability of glass formed in the first inorganic solid electrolyte may be enhanced.

Components of the first inorganic solid electrolyte and properties of the first inorganic solid electrolyte are explained below.

$R_2O$ (R: at least one selected from Li and Na) is an essential component to impart lithium ion conductivity to the first inorganic solid electrolyte. Therefore, the lower limit of the content of $R_2O$ is preferably 12%, more preferably 14%, and most preferably 16%. On the other hand, chemical resistance of the first inorganic solid electrolyte may be enhanced by adjusting $R_2O$ to 45% or less. Therefore, the upper limit of the content of $R_2O$ is preferably 45%, more preferably 42%, and most preferably 40%.

$SiO_2$ is a component which facilitates formation of glass by forming a network of glass. Therefore, $SiO_2$ may be included at greater than 0%. On the other hand, glass with a lower glass transition temperature and a lower softening temperature may be easily obtained by arranging $SiO_2$ to 75% or less. Therefore, the upper limit of the content of $SiO_2$ is preferably 75%, more preferably 70%, and most preferably 60%.

$P_2O_5$ is a component which lowers a glass transition temperature while facilitating formation of glass. Therefore, the lower limit of the content of $P_2O_5$ is preferably greater than 0%, more preferably 1%, and most preferably 3%. On the other hand, crystallization of the glass may be reduced by adjusting $P_2O_5$ to 83% or less. Therefore, the upper limit of the content of $P_2O_5$ is preferably 83%, more preferably 80%, and most preferably 74%.

$AO_2$ (A: at least one selected from Zr, Ti, and Ge) is a component which, when added in a small amount, allows formation of the first inorganic solid electrolyte having a more stable glass phase. Therefore, the content of $AO_2$ may be greater than 0%. On the other hand, crystallization of the first inorganic solid electrolyte may be reduced by adjusting $AO_2$ to 10% or less, which thus facilitates formation of an interface between other solid phases. Therefore, the upper limit of the content of $AO_2$ is preferably 10%, more preferably 8%, and most preferably 5%.

$M_2O_3$ (M: at least one selected from B, Al, Bi, La, Y, and Sc) is a component which, when added in a small amount, allows formation of the first inorganic solid electrolyte having a more stable glass phase. Therefore, the content of $M_2O_3$ may be greater than 0%. On the other hand, decrease of the lithium ion conductivity in first inorganic solid electrolyte may be suppressed by adjusting $M_2O_3$ to 20% or less. Therefore, the upper limit of the content of $M_2O_3$ is preferably 20%, more preferably 10%, and most preferably 5%.

In addition, greater than 0% of at least one selected from LiF, SrO, and $V_2O_5$ may be used in the first inorganic solid electrolyte. Thereby, various properties such as increase of lithium ion conductivity, increase of mechanical strength, and addition of electron conductivity may be imparted to the first inorganic solid electrolyte. On the other hand, from the viewpoint of assuring high lithium ion conductivity, the upper limit of the content of these components is preferably 10%, more preferably 5%, and most preferably 3%.

On the other hand, it is preferred in the first inorganic solid electrolyte that the content of S components, MgO, CaO, and $K_2O$ is decreased as low as possible. Particularly, generation of harmful gas such as hydrogen sulfide from the all-solid secondary battery may be reduced by decreasing S components. Additionally, disappearance of flow paths of lithium ion due to a so-called mixed alkali effect may be suppressed by decreasing MgO, CaO, and $K_2O$ components. Therefore, the upper limit of the content of one or more of these components is preferably 5%, more preferably 3%, and most preferably not contained.

Specific examples of the first inorganic solid electrolyte include amorphous or polycrystalline $LiPO_3$, $70LiPO_3$-$30Li_3PO_4$, $Li_2O$—$SiO_2$, and $Li_2O$—$SiO_2$—$P_2O_5$—$B_2O_5$—$BaO$. Among these, one or more selected from $Li_2O$—$P_2O_5$ type glass and $Li_2O$—$P_2O_5$-$M'_2O_3$ type glass (P: exchangeable with Si; M': Al or B) are particularly preferable, and the glass made amorphous by quenching molten $LiPO_3$ is most preferable. Particularly, the glass made amorphous by quenching molten $LiPO_3$ has an ion conductivity of $8.8 \times 10^{-9}$ which is not so high and a Tg of about 280° C. which is unlikely to cause crystallization, therefore, a solid electrolyte with a high ion conductivity may be formed by mixing this material with the second inorganic solid electrolyte and heating the mixture to 600° C. Furthermore, since selective margin of electrode active materials may be extended by using this material for the positive electrode layer or the negative electrode layer described later, an electrode active material other than phosphate can also be used. In addition, although it is preferred that an amorphous phase is formed in at least a part of the first inorganic solid electrolyte when preparing the all-solid secondary battery, the entire amount may be polycrystalline in the resulting all-solid secondary battery.

Preferably, the first inorganic solid electrolyte of this embodiment has a high lithium ion conductivity. More specifically, the ion conductivity containing a grain boundary resistivity is preferably $5 \times 10^{-9}$ S/cm or higher. Thereby, conduction of lithium ion through the first inorganic solid electrolyte may be smooth, thus the charge-discharge efficiency of the all-solid secondary battery may be further enhanced. Here, the lower limit of the ion conductivity containing a grain boundary resistivity of the first inorganic solid electrolyte is preferably $5 \times 10^{-9}$ S/cm, more preferably $8.0 \times 10^{-9}$ S/cm, and most preferably $1.5 \times 10^{-7}$ S/cm. In addition, when the ion conductivity is less than $1 \times 10^{-10}$ S/cm, the conduction of lithium ion does not occur substantially.

Preferably, the first inorganic solid electrolyte of this embodiment is easily softened. More specifically, the first inorganic solid electrolyte is preferably composed of a composition same as that of a glass with a grass transition temperature (Tg) of 250° C. or higher and 650° C. or lower. Thereby, the softening temperature of the glass also decreases, thus the glass may be easily softened by heating. Therefore, the upper limit of Tg of the glass composed of the composition same as that of the first inorganic solid electrolyte is preferably 650° C., more preferably 600° C., and most preferably 500° C. On the other hand, the lower limit of Tg, which is not limited, is generally 250° C. or higher, specifically 280° C. or higher, and more specifically 300° C. or higher in many cases.

Besides, the softening temperature (deformation point At) of the glass composed of the composition same as that of the first inorganic solid electrolyte is preferably lower than 800° C., more preferably lower than 700° C., and most preferably lower than 600° C. On the other hand, the lower limit of the softening temperature, which is not limited, is generally 250° C. or higher, specifically 380° C. or higher, and more specifically 400° C. or higher in many cases.

Besides, the lower limit of the melting point of the crystalline body composed of the composition same as that of the first inorganic solid electrolyte is preferably 500° C., more preferably 600° C., and most preferably 630° C. Thereby, the charge-discharge behavior may be enhanced since liquefaction of the first inorganic solid electrolyte is reduced.

Here, the softening temperature of the glass composed of the composition same as that of the first inorganic solid electrolyte is preferably lower than the phase transition temperature of the crystalline phase of the second inorganic solid electrolyte described later. Thereby, the first inorganic solid electrolyte may be softened without phase transition into the liquid phase or other crystalline phases of the second inorganic solid electrolyte, thus the layers of the all-solid secondary battery may be more uniform and an intended lithium ion conductivity may be obtained from the second inorganic solid electrolyte. Therefore, the softening temperature of the glass is preferably lower than the phase transition temperature of the crystalline phase of the second inorganic solid electrolyte with a difference of 0° C. or more, more preferably 50° C. or more, and most preferably 70° C. or more.

The average particle diameter (D50) of the powder of the first inorganic solid electrolyte is preferably 20 μm or less. Thereby, discharge of solvent or comminution of the voids due to solvent may be facilitated. Accordingly, the average particle diameter (D50) is preferably 20 μm or less, more preferably 10 μm or less, and most preferably 5 μm or less. On the other hand, the lower limit of the average particle diameter (D50) is preferably 0.05 μm or more, more preferably 0.1 μm or more, and most preferably 0.2 μm or more in view of shortening the time necessary for comminution. Here, the "average particle diameter" in this specification refers to an average diameter on volume basis measured using a particle size measuring apparatus of laser diffraction/scattering type.

It is preferred in the solid electrolyte layer of this embodiment that the content of the first inorganic solid electrolyte is 0.5% to 15% in terms of mass percent. Particularly, when the content of the first inorganic solid electrolyte is adjusted to 0.5% or more, the voids formed by other solid phases including the second inorganic solid electrolyte are embedded by the first inorganic solid electrolyte, thus the lithium ion conductivity of the solid electrolyte layer may be further increased. Therefore, the lower limit of the content of the first inorganic solid electrolyte in the solid electrolyte layer is preferably 0.5%, more preferably 2%, and most preferably 3%. On the other hand, by adjusting the content of the first inorganic solid electrolyte to 15% or less, the lithium ion conductivity of the solid electrolyte layer may be increased more easily than the case of using the first inorganic solid electrolyte alone. Furthermore, since the other solid phases do not readily move in the layer when the first inorganic solid electrolyte is softened, shape stability of the all-solid secondary battery may be enhanced under heating. Therefore, the upper limit of the content of the first inorganic solid electrolyte in the solid electrolyte layer is preferably 15%, more preferably 12%, and most preferably 10%. Here, the content of the first inorganic solid electrolyte represents a ratio of (first inorganic solid electrolyte)/(first inorganic solid electrolyte+second inorganic solid electrolyte).

(Second Inorganic Solid Electrolyte)

The second inorganic solid electrolyte contains 15% by mass or more of transition metal components on oxide basis. Thereby, the second inorganic solid electrolyte is likely to exist stably in crystalline state and thus may easily maintain a solid state even when the first inorganic solid electrolyte is softened. Here, the transition metal component is preferably at least one selected from Zr, Ti, and Ge. By including 15% or more of these components, grass phases are more unlikely to form, thus the crystallinity of the second inorganic solid electrolyte may be further enhanced, thereby ion conductivity and then function as the electrolyte may be enhanced.

Preferably, the second inorganic solid electrolyte contains 3 to 20% of $R_2O$ and 15 to 35% of $AO_2$, and the content of $SiO_2$ is 0 to 10%, the content of $P_2O_5$ is 0 to 60%, and the content of $M_2O_3$ is 0 to 60%, in terms of mass percent on oxide basis. Here, R is at least one selected from Li and Na; A is at least one selected from Zr, Ti, and Ge; and M is at least one selected from B, Al, Bi, La, Y, and Sc. Thereby, inclusion of $AO_2$ as an essential component leads to easy formation of crystals with ion conductivity, such as Nasicon-type crystals, in the second inorganic solid electrolyte, thus the ion conductivity of the second inorganic solid electrolyte may be enhanced.

Components of the second inorganic solid electrolyte and properties of the second inorganic solid electrolyte are explained below.

$R_2O$ (R: at least one selected from Li and Na) is an essential component to impart lithium ion conductivity to the second inorganic solid electrolyte. Therefore, the lower limit of the content of $R_2O$ is preferably 3%, more preferably 4%, and most preferably 4.5%. On the other hand, chemical strength of the second inorganic solid electrolyte may be enhanced and morphological stability of the all-solid secondary battery may be improved by adjusting the $R_2O$ to 20% or less. Therefore, the upper limit of the content of $R_2O$ is preferably 20%, more preferably 15%, and most preferably 13%.

$SiO_2$ is a component which enhances mechanical strength of the second inorganic solid electrolyte and also a component which improves ion conductivity through partial exchange with $P_2O_5$ of a lithium ion conductive crystal such as NASICON. Therefore, $SiO_2$ may be included at greater than 0%. On the other hand, glass formation may be made difficult by adjusting $SiO_2$ to 10% or less. Therefore, the upper limit of the content of $SiO_2$ is preferably 10%, more preferably 5%, and most preferably 3%.

$P_2O_5$ is a component which facilitates formation of a crystal with high lithium ion conductivity such as NASICON. Therefore, $P_2O_5$ may be included at greater than 0%. On the other hand, the lithium ion conductivity of a crystal to be formed may be made difficult to decrease by adjusting $P_2O_5$ to 60% or less. Therefore, the upper limit of the content of $P_2O_5$ is preferably 60%, more preferably 58%, and most preferably 55%.

$AO_2$ (A: at least one selected from Zr, Ti, and Ge) is an essential component to promote crystallization of the second inorganic solid electrolyte. Therefore, the lower limit of the content of $AO_2$ is preferably 15%, more preferably 20%, and most preferably 25%. On the other hand, the lithium ion conductivity of a crystal to be formed may be made difficult to decrease by adjusting $AO_2$ to 35% or less. Therefore, the upper limit of the content of $AO_2$ is preferably 35%, more preferably 34%, and most preferably 33%.

$M_2O_3$ (M: at least one selected from B, Al, Bi, La, Y, and Sc) is a component which, when added in a small amount, allows control of ion conductivity, mechanical strength, etc. of crystals through partial exchange with the $AO_2$ component of a crystal to be formed. Therefore, $M_2O_3$ may be included at greater than 0%. On the other hand, decrease of lithium ion conductivity of the second inorganic solid electrolyte may be suppressed by adjusting $M_2O_3$ to 60% or less. Therefore, the upper limit of the content of $M_2O_3$ is preferably 60%, more preferably 59%, and most preferably 58.5%.

In addition, at least one selected from LiF, SrO, and $V_2O_5$ may be used. The content of S components is preferably reduced as low as possible. The range of those contents is similar to those of the first inorganic solid electrolyte.

It is particularly preferable that the second inorganic solid electrolyte contains a crystal of oxide selected from NASICON-type, $\beta$-$Fe_2(SO_4)_3$-type, and perovskite-type. Thereby, appropriate ion conductivity may be obtained. In the present invention, an effect to increase ion conductivity similar to that of NASICON-type has been found even when garnet-type $Li_7La_3Zr_2O_{12}$ was used in the second inorganic solid electrolyte. As such, in the present invention, the effect to increase ion conductivity is realized in various second inorganic solid electrolytes in addition to NASICON-type.

Specific examples of the second inorganic solid electrolyte include $Li_6BaLa_2Ta_2O_{12}$, LiN, $La_{0.55}Li_{0.35}TiO_3$, $Li_{1+x}Al_x(Ti, Ge)_{2-x}(PO_4)_3$, $LiTi_2P_3O_{12}$, and $Li_{1.5}Al_{0.5}Ge_{1.5}(PO_4)_3$. Among these, it is particularly preferable that a crystal of $Li_{1+x+z}E_yG_{2-j}Si_zP_{3-z}O_{12}$ is included, in which, j, x, y, z satisfy $0 \le x \le 0.8$, $0 \le z \le 0.6$, $0 \le y \le 0.6$, $0 \le j \le 0.6$; E is one or more selected from Al and Ga; and G is one or more selected from Ge, Ti, Zr, Y, and Sc. Among these in particular, it is most preferable that one or more selected from $Li_{1+x}Al_xTi_{2-x}(PO_4)_3$ having NASICON-type, $Li_3Ti_2(PO_4)_3$ having $\beta$-$Fe_2(SO_4)_3$-type, $Li_7La_3Zr O_{12}$ having garnet-type, and (Li,La)$TiO_3$ having perovskite-type is used. Thereby, lithium ion conductivity may be enhanced and also chemical stability may be enhanced.

It is preferred that the second inorganic solid electrolyte of this embodiment has a high lithium ion conductivity. More specifically, the ion conductivity without grain boundary resistivity is preferably $1 \times 10^{-6}$ S/cm or more. Thereby, conduction of lithium ion through the second inorganic solid electrolyte may be smooth, thus the charge-discharge efficiency of the all-solid secondary battery may be further enhanced. Here, the lower limit of the ion conductivity containing a grain boundary resistivity of the second inorganic solid electrolyte is preferably $1 \times 10^{-6}$ S/cm, more preferably $5 \times 10^{-6}$ S/cm, and most preferably $1 \times 10^{-5}$ S/cm.

The average particle diameter (D50) of the powder of the second inorganic solid electrolyte is preferably 20 μm or less. Thereby, discharge of solvent or comminution of the voids due to solvent may be facilitated. Accordingly, the average particle diameter (D50) is preferably 20 μm or less, more preferably 10 μm or less, and most preferably 5 μm or less. On the other hand, the lower limit of the average particle diameter (D50) is preferably 0.05 μm or more, more preferably 0.1 μm or more, and most preferably 0.2 μm or more in view of shortening the time necessary for comminution.

Besides, the ratio of the average particle diameter (D50) of the powder of the first inorganic solid electrolyte versus the average particle diameter (D50) of the powder of the second inorganic solid electrolyte is preferably 2.00 or less. Particularly, by adjusting the ratio to 2.00 or less, the skeleton of the raw material composition may be maintained by other constitutional components even when the powder of the first inorganic solid electrolyte is softened, thus there may be obtained the all-solid secondary battery where each layer has been formed with an intended thickness. Accordingly, the upper limit of the ratio is preferably 2.00, more preferably 1.00, and most preferably 0.50. On the other hand, the ratio is not particularly limited, but it is preferred in the all-solid secondary battery of this embodiment that the ratio is 0.50 or more. Thereby, coarsening of the powder of the second inorganic solid electrolyte may be reduced, thus the thickness of the solid electrolyte may be easily reduced, and flow path of electrons may be easily formed by the conductive additive in a case of forming the electrode layer. Accordingly, the lower limit of the ratio is preferably 0.05, more preferably 0.10, and most preferably 0.20.

It is preferred in the solid electrolyte layer of this embodiment that the total of the first inorganic solid electrolyte and the second inorganic solid electrolyte based on the entire of the solid electrolyte layer is 95% or more in terms of mass percent. Thereby, materials not contributing to conduction of lithium ion may be reduced, thus the lithium ion conductivity of the solid electrolyte layer may be more easily enhanced. Therefore, the lower limit of the total content is preferably 95%, more preferably 98%, and the total content is most preferably 100%.

Preferably, the first inorganic solid electrolyte and the second inorganic solid electrolyte used in this embodiment are not sulfide in order to prevent generation of harmful gas such as hydrogen sulfide.

Positive Electrode Layer and Negative Electrode Layer

Preferably, the positive electrode layer of this embodiment contains the first inorganic solid electrolyte and the second inorganic solid electrolyte described above, a positive electrode active material, and a conductive additive. Preferably, the negative electrode layer of this embodiment contains the first inorganic solid electrolyte and the second inorganic solid electrolyte described above, a negative electrode active material, and a conductive additive. Thereby, the second inorganic solid electrolyte, the electrode active material, and the conductive additive may exist in solid state even when the first inorganic solid electrolyte is softened by heating, thus morphological stability of the electrode layer may be attained and localization of constituent elements may be reduced, thereby the electrode active material may easily contact both of the solid electrolyte and the conductive additive. At the same time, the first inorganic solid electrolyte is likely to soften under heating at a lower temperature, thus thermal decomposition of the electrode active material may be reduced. Here, in this specification, the positive electrode layer and the negative electrode layer are generically referred to as an electrode layer, and the positive electrode active material and the negative electrode active material are generically referred to as an electrode active material.

(First Inorganic Solid Electrolyte)

It is preferred in the electrode layer of this embodiment that the content of the first inorganic solid electrolyte is 1% to 15% in terms of mass percent. Particularly, when the content of the first inorganic solid electrolyte is adjusted to 1% or more, the voids formed by other solid phases including the second inorganic solid electrolyte are embedded by the first inorganic solid electrolyte, thus the lithium ion conductivity of the electrode layer may be further increased. Therefore, the lower limit of the content of the first inorganic solid electrolyte in the electrode layer is preferably 1%, more preferably 3%, and most preferably 5%. On the other hand, by adjusting the content of the first inorganic solid electrolyte to 15% or less, the lithium ion conductivity of the electrode layer may be easily increased compared to the case of using the first inorganic solid electrolyte alone. Furthermore, since the other solid phases do not readily move in the layer when the first inorganic solid electrolyte is softened, shape stability of the all-solid secondary battery may be enhanced under heating. Therefore, the upper limit of the content of the first inorganic solid electrolyte in the electrode layer is preferably 15%, more preferably 12%, and most preferably 10%. Here, the content of the first inorganic solid electrolyte also represents a ratio of (first inorganic solid electrolyte)/(first inorganic solid electrolyte+second inorganic solid electrolyte).

(Positive Electrode Active Material and Negative Electrode Active Material)

Preferably, the positive electrode active material is NASICON-type $LiV_2(PO_4)_3$, olivine-type $Li_xJ_yMtPO_4$ (in which, J: at least one selected from Al, Mg, and W; Mt: at least one selected from Ni, Co, Fe, and Mn; $0.9 \le x \le 1.5$, $0 \le y \le 0.2$), layer oxides, or spinel-type oxides, for example. Among these in particular, it is more preferably composed of $LiMtO_2$ and/or $LiMt_2O_4$ (in which, Mt: one or more selected from Fe, Ni, Co, and Mn). Thereby, the solid electrolyte and the positive electrode active material become easy to make contact and thus lithium ion is likely to be transferred between the solid electrolyte and the positive electrode active material, therefore, the charge-discharge behavior of the all-solid secondary battery may be further enhanced. $LiCoPO_4$, $LiCoO_2$, $LiMn_2O_4$, and $LiFePO_4$ may be used as the positive electrode active material, for example. Particularly, by forming it from $LiMtO_2$ and/or $LiMt_2O_4$, a joint surface is formed between a portion where lithium ion is two-dimensionally or three-dimensionally reserved and a portion where lithium ion conducts. By further adding Mg as a minor component, discharged capacity may be increased since thermal decomposition of the positive electrode active material may be suppressed.

On the other hand, preferably, the negative electrode active material is at least one selected from oxides containing NASICON-type, olivine-type, or spinel-type crystal; rutile-type oxides, anatase-type oxides, or amorphous metal oxides; and metal alloys, etc. Among these in particular, it is more preferably composed of $Li_{1+x+z}Al_yTi_2Si_zP_{3-z}O_{12}$ (in which, $0 \leq x \leq 0.8$, $0 \leq z \leq 0.6$, $0 \leq y \leq 0.6$), $Li_4Ti_5O_{12}$, or $TiO_2$. Thereby, the solid electrolyte and the negative electrode active material become easy to make contact, thus lithium ion is likely to be transferred between the solid electrolyte and the positive electrode active material, therefore, the charge-discharge behavior of the all-solid secondary battery may be further enhanced. Particularly, when formed from $Li_4Ti_5O_{12}$ and/or $TiO_x$, since negative electrode potential is decreased, voltage of the battery may be increased. $Li_2V_2(PO_4)_3$, $Li_2Fe_2(PO_4)_3$, $LiFePO_4$, $Li_4Ti_5O_{12}$, $SiO_x$ ($0.25 \leq x \leq 2$), and $Cu_6Sn_5$ may be used as the negative electrode active material, for example.

Preferably, the content of the positive electrode active material and the negative electrode active material is 1% by mass or more and 70% by mass or less based on all materials in the electrode layer (i.e., positive electrode material or negative electrode material). Particularly, by adjusting the content to 1% by mass or more, battery capacity of the secondary battery may be increased. Therefore, the lower limit of the content of the positive electrode active material and the negative electrode active material is preferably 1% by mass, more preferably 2% by mass, and most preferably 4% by mass. On the other hand, electron conductivity of the electrode layer may be easily assured by adjusting the content to 70% by mass or less. Therefore, the upper limit of the content of the positive electrode active material and the negative electrode active material is preferably 70% by mass, more preferably 60% by mass, and most preferably 50% by mass. Particularly, in the present invention, since lithium ion conductivity may be easily assured by the first inorganic solid electrolyte and the second inorganic solid electrolyte even in a narrower ion conduction path, it may be possible to increase the content of the positive electrode active material and the negative electrode active material.

(Conductive Additive)

Carbon, metals composed of at least one of Ni, Fe, Mn, Co, Mo, Cr, Ag, and Cu, and alloys of these elements may be used as the conductive additive. Metals such as titanium, stainless, and aluminum, and noble metals such as platinum, silver, gold, and rhodium may also be used. By using a material with higher electron conductivity as the conductive additive, an amount of current capable of flowing through a narrow electron conductive path formed in the electrode layer is increased, thus the charge-discharge behavior of the all-solid secondary battery may be enhanced.

The content of the conductive additive is preferably 1% by mass or more and 20% by mass or less, more preferably 2% by mass or more and 15% by mass or less, and most preferably 4% by mass or more and 10% by mass or less based on the total of the electrode materials (i.e., positive electrode active materials and negative electrode active materials) in the electrode layer from the viewpoint of the balance between the battery capacity and the electron conductivity of the electrode layer.

Here, in the all-solid secondary battery of the present invention, one or two of the solid electrolyte layer, the positive electrode layer, and the negative electrode layer may be conventional one, and the conventional one may be combined with the constitution of the solid electrolyte layer, the positive electrode layer, and/or the negative electrode layer of this embodiment. However, when the solid electrolyte layer, the positive electrode layer, and the negative electrode layer are respectively of this embodiment, these may be easily formed at the same time, thus the all-solid secondary battery may be formed more effectively.

Besides, the content and composition of the solid electrolyte, the electrode active material, and the conductive additive in the all-solid secondary battery of the present invention can be identified by cutting off the solid electrolyte layer and/or electrode layer of the all-solid secondary battery and using an energy loss analyzer or X-ray analyzer mounted on a field-emission transmission electron microscopy (FE-TEM) or an X-ray analyzer mounted on a field-emission scanning electron microscopy (FE-SEM). Existence or nonexistence of the first inorganic solid electrolyte and the second inorganic solid electrolyte or compositional ratio thereof in the positive electrode later, for example, may be revealed using the quantitative analysis or point analysis. Here, when the X-ray analyzer is used, $Li_2O$ cannot be directly analyzed, but the content of $Li_2O$ can be estimated by calculating an electric charge from other constitutional components.

[Method of Manufacturing All-Solid Secondary Battery]

The method of manufacturing an all-solid secondary battery of the present invention includes a mixing step in which an amorphous powder of the first inorganic solid electrolyte and a crystalline powder of the second inorganic solid electrolyte are mixed to prepare a raw material composition and a heat treatment step in which the raw material composition is heated to soften the powder of the first inorganic solid electrolyte. Here, the method may further include a molding step to mold the raw material composition into a compact with a desired shape.

(Mixing Step)

In the mixing step, the amorphous powder of the first inorganic solid electrolyte and the crystalline powder of the second inorganic solid electrolyte are mixed to prepare the raw material composition. Thereby, the raw material composition is uniformly mixed, thus and localization of constituent elements may be reduced, thereby the electrode active material may easily contact both of the solid electrolyte and the conductive additive.

Specific example of the mixing step is appropriately selected from means allowing to uniformly mix the raw material composition; for example, the first inorganic solid electrolyte and the second inorganic solid electrolyte may be mixed with a solvent and a binder to prepare the raw material composition. Thereby, flowability results in the raw material composition at normal temperature, thus the molding of the raw material composition may be easily performed. However, in this embodiment, the solvent and binder in the raw material composition are preferably reduced and most preferably not included at all. Thereby, volatilization of solvent, binder, etc. may be reduced when the powder of the first inorganic solid electrolyte is softened, thus the all-solid secondary battery with less voids and higher charge-discharge behavior may be obtained.

In regards to the method to reduce the solvent or binder in the raw material composition, the method to prepare the raw material composition by mixing the powder of the first inorganic solid electrolyte, the powder of the second inorganic solid electrolyte, etc. in a powder state may be used. However, it is preferred that the powder of the first inorganic solid electrolyte, the powder of the second inorganic solid electrolyte, etc. are mixed with adding a solvent such as water and a dispersing agent and then the solvent is dried, and the mixture resulting from the desiccation is crushed into powder. The mixing of the powder of first inorganic solid electrolyte, the powder of the second inorganic solid electrolyte, etc. may be facilitated by mixing together with the solvent and the dispersing agent. Besides, the remaining solvent may be discharged from the raw material composition by way of crushing the mixture after removing the solvent, and also the voids due to the solvent may be crushed, thus adverse affects of them on the charge-discharge behavior or mass energy density of the all-solid secondary battery may be reduced.

Here, it is preferred that the powder of the first inorganic solid electrolyte, the powder of the first inorganic solid electrolyte, the electrode active material, and the conductive additive are crushed to 20 μm or less by average particle diameter (D50). Thereby, discharge of the solvent and crushing of the voids due to the solvent may be facilitated. Accordingly, the average particle diameter (D50) of them is preferably 20 μm or less, more preferably 10 μm or less, and most preferably 5 μm or less. On the other hand, the lower limit of the average particle diameter (D50) of them is preferably 0.05 μm or more, more preferably 0.1 μm or more, and most preferably 0.2 μm or more from the viewpoint of allowing to shorten the time for the crushing. In addition, the "average particle diameter" in this specification refers to an average diameter on volume basis measured using a particle size measuring apparatus of laser diffraction/scattering type.

Here, the powder of the solid electrolyte layer of the raw material composition in the solid electrolyte layer is preferably composed of the powder of the first inorganic solid electrolyte and the powder of the second inorganic solid electrolyte. Furthermore, the powder of the positive electrode layer of the raw material composition in the positive electrode layer is preferably composed of the powder of the first inorganic solid electrolyte, the powder of the second inorganic solid electrolyte, the positive electrode active material, and the conductive additive. Furthermore, the powder of the negative electrode layer of the raw material composition in the negative electrode layer is preferably composed of the powder of the first inorganic solid electrolyte, the powder of the second inorganic solid electrolyte, the negative electrode active material, and the conductive additive.

(Molding Step)

It is preferred in the method of manufacturing the all-solid secondary battery of the present invention that a molding step to shape the raw material composition is performed. Thereby, the raw material composition is formed into a predetermined shape, thus the all-solid secondary battery with a predetermined shape may be easily obtained.

Preferably, the specific embodiment of the molding step includes a step of supplying the raw material composition into a molding die and flattening the surface of the raw material composition. Furthermore, the raw material composition is shaped by pressing. Thereby, the powder of the raw material composition is supplied into the molding die in a uniform thickness, thus the positive electrode layer, the negative electrode layer, and/or the solid electrolyte layer may be easily formed with a uniform thickness even when the powder of the first inorganic solid electrolyte is softened. In the step of flattening the surface of the raw material composition, a rod-like member having a cross-section with a shape and a size same as those of an opening of the molding die may be used, for example.

In the molding step, the raw material compositions of the layers may be respectively shaped and then belatedly contacted after a heat treatment step described later. However, it is more preferred that two or more of the raw material compositions among the positive electrode layer, the negative electrode layer, and the solid electrolyte layer are shaped simultaneously. Thereby, the solid electrolyte layer and the positive electrode layer and/or the negative electrode layer are shaped in a unified manner, thus lithium ion conductivity may be enhanced at the contacting portions of them.

Preferably, the thickness of the solid electrolyte layer shaped in this molding step is relatively thinner as possible since the thickness is sufficient as long as the negative electrode layer and the positive electrode layer can be electrically separated. On the other hand, the thickness of the solid electrolyte layer is preferably 0.5 μm or more from the viewpoint of providing a mechanical strength necessary for the solid electrolyte layer. Accordingly, the thickness of the solid electrolyte layer is preferably 0.5 μm to 100 μm, more preferably 1 μm to 50 μm, and most preferably 1 μm to 20 μm.

It is also preferred that the thickness of the negative electrode layer and the positive electrode layer is 1 μm or more from the viewpoint of providing an ability of sorbing lithium ion as a secondary battery. On the other hand, when the thickness of these layers is excessively large, the conduction path of lithium ion or electron is likely to be lost. Accordingly, the thickness of the negative electrode layer and the positive electrode layer is preferably 1 μm to 100 μm, more preferably 1 μm to 50 μm, and most preferably 1 μm to 20 μm.

Additionally, in an embodiment to use a solvent or a binder, a mixed slurry containing the powder of the positive electrode layer, the powder of the negative electrode layer, the powder of the solid electrolyte layer, the solvent, and/or the binder may be shaped into a thin plate, for example, by coating processes such as spin coating and dip coating, doctor blades, calender processes, printing processes, die coater processes, spray processes.

(Heat Treatment Step)

In the heat treatment step, the raw material composition is heated to soften the powder of the first inorganic solid electrolyte. Thereby, the powder of the first inorganic solid electrolyte is softened, which results in that the softened first inorganic solid electrolyte enters into the voids formed by solids including the powder of the second inorganic solid electrolyte. Therefore, the positive electrode layer, the negative electrode layer, and/or the solid electrolyte layer with less voids, higher lithium ion conductivity, and higher mechanical strength may be prepared.

The heat treatment step is preferably performed at a heat treatment temperature higher than Tg of the first inorganic solid electrolyte, more preferably performed at a heat treatment temperature higher than the softening temperature of the first inorganic solid electrolyte. Thereby, the first inorganic solid electrolyte is easily softened, thus lithium ion conductivity of the solid electrolyte layer in the positive electrode layer, the negative electrode layer, and the solid electrolyte layer may be enhanced. Particularly, the first inorganic solid electrolyte is softened even without external pressure at a temperature higher than the softening temperature of the first inorganic solid electrolyte, thus the effect to enhance the lithium ion conductivity of the solid electrolyte layer may be further improved.

On the other hand, preferably, the maximum temperature in the heat treatment step is set within a range not causing melting or phase-change of the powder of the second inorganic solid electrolyte, the electrode active material, and the conductive additive. That is, the upper limit of the maximum temperature is preferably 1100° C., more preferably 1050° C., and most preferably 1000° C.

It is more preferred in the heat treatment step that the raw material composition is heated while being pressed. Thereby, the softened first inorganic solid electrolyte is facilitated to enter into the voids of the raw material composition and the gas in the voids is facilitated to discharge. Therefore, the lithium ion conductivity of the solid electrolyte in the all-solid secondary battery may be further enhanced. Furthermore, in the electrode layer in particular, a flow path of electron may be easily assured by the conductive additive since the voids in the raw material composition are decreased. Here, the lower limit of the pressure to press the raw material composition is preferably 100 kPa, more preferably 1 MPa, and most preferably 10 MPa from the viewpoint of easily getting the effect. Furthermore, the upper limit of the pressure is preferably 800 MPa, more preferably 400 MPa, and most preferably 200 MPa from the viewpoint of reducing breakage of molding dies or the pressed raw material composition. The means to press the raw material composition is exemplified by an embodiment of mounting an upper die on a molding die for shaping the raw material composition and pressing them by a hydraulic press, etc.

It is also preferred in the heat treatment step that the heat treatment is performed in air since reaction with the raw material composition may be prevented by performing the heat treatment at a temperature lower than that of conventional sintering of raw material compositions. Here, the calcination may be carried out in an atmosphere containing at least one gas selected from $N_2$, $H_2$, He, Ar, $CO_2$, CO, and $CH_4$. Thereby, transformation or burnout of the raw material composition or heat treatment devices may be further reduced.

(Formation of Current Collector)

The method of manufacturing the all-solid secondary battery of the present invention may have a step of forming a current collector in the positive electrode layer and/or the negative electrode layer. Thereby, electricity may be easily taken through the current collector, thus charge to the all-solid secondary battery and discharge from the all-solid secondary battery may be facilitated. In regards to the specific embodiment of laminating the current collector, a thin-film metal layer may be laminated or contacted to the resulting positive electrode layer and/or the negative electrode layer; alternatively a precursor of metal layer or a precursor of electric conductor may be laminated to the raw material composition and then calcined. In addition, the formation of the current collector may be omitted when the electrode layer itself has a high electron conductivity.

EXAMPLES

The present invention is hereinafter described by providing specific examples.

Examples 1 to 3, Comparative Examples 1 to 6

Preparation of First Inorganic Solid Electrolyte

Table 1 shows compositions, glass transition temperatures, and ion conductivities of first inorganic solid electrolytes used in Examples 1 to 3 and Comparative Examples 1 to 6. For the first inorganic solid electrolytes, highly pure raw materials used for regular glasses such as oxides, hydroxides, carbonates, nitrates, fluorides, chlorides, and meta-phosphoric acid compounds corresponding to their raw materials of respective components were respectively selected and used. These raw materials were weighed in the compositional ratios of the first inorganic solid electrolytes shown in Table 1 and uniformly mixed, followed by being poured into a platinum crucible and melted at 1200° C. The molten glasses were sandwiched and quenched by ion plates thereby to prepare the first inorganic solid electrolytes. The resulting first inorganic solid electrolytes were respectively a transparent glass body at this time. A portion of the first inorganic solid electrolytes were used for measuring an ion conductivity. Furthermore, the residues of the inorganic solid electrolytes were milled into an average particle diameter of 3 μm (D50) by a planetary ball mill, thereby obtaining the powders of the first inorganic solid electrolytes (hereinafter called as "first powders A to C").

On the other hand, as a reference example, a glass ($SiO_2$—$TiO_2$ type glass) with a transition metal content of 15% by mass or more was used as a first inorganic solid electrolyte, which was similarly subjected to measurement of an ion conductivity and milling by the planetary ball mill (the resulting powder of the first inorganic solid electrolyte was called as "first powder D").

Here, the measurement of the ion conductivity was performed by forming a gold electrode of thickness 10 nm and diameter 16 mm on both sides of the first inorganic solid electrolyte using a DC sputtering process and measuring an ion conductivity between the bold electrodes containing a grain boundary resistivity by an impedance analyzer (by Solartron Co., SI1260, 1296).

TABLE 1

| | Glass composition (% by mass) | | | | | | Glass transition temperature (Tg) | Ion conductivity (S/cm)* |
|---|---|---|---|---|---|---|---|---|
| | $Li_2O$ | $SiO_2$ | $P_2O_5$ | $TiO_2$ | $B_2O_3$ | Other component(s) | | |
| First powder A $LiPO_3$ (melting point: 650° C.) | 17.4 | 0 | 82.6 | 0 | 0 | — | 330° C. | $8.8 \times 10^{-9}$ |
| First powder B $LiPO_3$—$Li_3PO_4$ | 25.2 | 0 | 74.8 | 0 | 0 | — | 320° C. | $1.7 \times 10^{-7}$ |
| First powder C $Li_2O$—$SiO_2$ | 38.0 | 49.9 | 5.9 | 3.3 | 2.9 | — | 450° C. | $5.2 \times 10^{-6}$ |

TABLE 1-continued

| | Glass composition (% by mass) | | | | | Glass transition temperature (Tg) | Ion conductivity (S/cm)* |
|---|---|---|---|---|---|---|---|
| | $Li_2O$ | $SiO_2$ | $P_2O_5$ | $TiO_2$ | $B_2O_3$ | Other component(s) | | |
| First powder D (reference) $SiO_2$—$TiO_2$ type glass | 0 | 60.5 | 0 | 18.2 | 0 | $K_2O$, $Na_2O$, etc. | 585° C. | $<1 \times 10^{-10}$ |

*The ion conductivity indicates those containing a grain boundary resistivity.

As a result, the ion conductivities containing a grain boundary resistivity of the first powders A to C were $5 \times 10^{-9}$ S/cm or more which represents lithium ion conductivity; however, the ion conductivity containing a grain boundary resistivity of the first powder D was less than $1 \times 10^{-10}$ S/cm which represents almost no lithium ion conductivity. It was demonstrated from these results that an amorphous powder of the first inorganic solid electrolyte with lithium ion conductivity can be obtained by adjusting at least the content of transition metal component to less than 15% by mass.

Preparation of Second Inorganic Solid Electrolyte

Table 2 shows compositions and ion conductivities of second inorganic solid electrolytes used in Examples 1 to 3 and Comparative Examples 1 to 6.

Among these, a LATP glass ceramic electrolyte (LICGC) was prepared as a second powder A.

Raw materials similar to those of the first inorganic solid electrolytes were weighed in the compositional ratios of the second powder A shown in Table 2, followed by being poured into a platinum crucible and melted at 1480° C. for 3 hours, then which was cast into water to form a glass body. The glass body was milled into a powder of an average particle diameter of 3 μm (D50) by a planetary ball mill, and then which was pressed under a pressure of 196 MPa into disk tablets of diameter 20 mm and thickness 1 mm by a tableting device, thereby obtaining compacts. The compacts were calcined at 1000° C. for 1 hour, then a portion of the resulting pellets were used for measuring an ion conductivity. Furthermore, the residue of the pellets was milled into an average particle diameter of 3 μm (D50) by a planetary ball mill, and the resulting powder was heat treated at 1000° C. for 10 hours, thereby obtaining a powder of the second inorganic solid electrolyte (second powder A).

Here, the measurement of ion conductivity was performed by attaching a gold electrode on both sides of a calcined pellet using a DC magnetron sputter device (by Sanyu Electron Co., QUICK COATER SC-701HMC) then to measure an AC impedance, and measuring an ion conductivity without boundary from a contact point between an arc indicating a capacity component of radiofrequency side and a real axis. Here, when the arc indicating a capacity component and the real axis did not intersect, it was determined by extrapolating an arc from low-frequency side.

On the other hand, a LZP glass ceramic electrolyte (LZP) was prepared as a second powder B.

Raw materials similar to those of the first inorganic solid electrolytes were weighed in the compositional ratios of the second powder B shown in Table 2 without $ZiO_2$ and mixed uniformly, followed by being poured into a platinum crucible and melted at 1300° C. for 2 hours, then the molten glass was cast into water to form a powder of raw material without $ZrO_2$. The powder of raw material was milled into an average particle diameter of 3 μm (D50) by a planetary ball mill, to which then a predetermined amount of $ZrO_2$ was added and mixed by a pot mill at 120 rpm for 4 hours, and then which was pressed under a pressure of 196 MPa into disk tablets of diameter 20 mm and thickness 1 mm by a tableting device, thereby obtaining compacts. The compacts were calcined at 1480° C. for 14 hours, then a portion of the resulting pellets were used for measuring an ion conductivity by a similar method to that of the second powder A. Furthermore, the residue of the pellets was milled into an average particle diameter of 3 μm (D50) by a planetary ball mill, thereby obtaining a powder of the second inorganic solid electrolyte (second powder B).

Furthermore, a $Li_7La_3Zr_2O_{12}$ polycrystalline electrolyte (LLZ) was prepared as a second powder C.

Raw materials similar to those of the first inorganic solid electrolytes were weighed in the compositional ratios of the second powder C shown in Table 2 and mixed using a pot mill at 120 rpm for 4 hours, and then which was pressed under a pressure of 196 MPa into disk tablets of diameter 20 mm and thickness 1 mm by a tableting device, followed by being calcined on an alumina pan lined with a $ZrO_2$ powder at 1200° C. for 20 hours. A portion of the resulting pellets were used for measuring an ion conductivity by a similar method to that of the second powder A. Furthermore, the residue of the pellets was milled into an average particle diameter of 3 μm (D50) by a planetary ball mill, thereby obtaining a powder of the second inorganic solid electrolyte (LLZ electrolyte powder, second powder C).

TABLE 2

| | Composition of electrolyte (% by mass) | | | | | | | Ion conductivity (S/cm)** |
|---|---|---|---|---|---|---|---|---|
| | $Li_2O$ | $SiO_2$ | $P_2O_5$ | $TiO_2$ | $ZrO_2$ | $Al_2O_3$ | $La_2O_3$ | |
| Second powder A (LICGC) | 5.7 | 2.7 | 52.4 | 32.2 | 0 | 8.0 | 0 | $2 \times 10^{-3}$ |
| Second powder B (LZP) | 4.7 | 2.7 | 52.4 | 0 | 32.2 | 8.0 | 0 | $1 \times 10^{-4}$ |

TABLE 2-continued

| | Composition of electrolyte (% by mass) | | | | | | | Ion conductivity |
|---|---|---|---|---|---|---|---|---|
| | $Li_2O$ | $SiO_2$ | $P_2O_5$ | $TiO_2$ | $ZrO_2$ | $Al_2O_3$ | $La_2O_3$ | (S/cm)** |
| Second powder C (LLZ) | 12.5 | 0 | 0 | 0 | 29.3 | 0 | 58.2 | $5 \times 10^{-4}$ |

**The ion conductivity indicates a bulk ion conductivity without grain boundary resistivity.

(Mixing, Molding, and Heat Treatment of Glass Electrolyte and Polycrystalline Electrolyte)

The powder of the first inorganic solid electrolyte and the powder of the second inorganic solid electrolyte in Examples 1 to 3, only the powder of the second inorganic solid electrolyte in Comparative Examples 1, 3, 5, and a commercial available glass and the powder of the second inorganic solid electrolyte in Comparative Examples 2, 4, 6 were respectively heat-treated and molded, and the resulting solid electrolyte layers were measured for an ion conductivity.

The powder of the first inorganic solid electrolyte, the powder of the second inorganic solid electrolyte, and the glass were blended in a total amount of 2 grams so as to correspond to 5% by mass of total mass of a slurry, to which then 10 grams of water and 30 grams of zirconia balls of diameter 5 mm were added, then these were mixed by a planetary centrifugal vacuum mixer (by Thinky Co., ARV-200) at 1000 rpm for 10 minutes and dried, followed by being milled by Labo Milser (by Iwatani Co. LM-PLUS) at 20000 rpm for 30 minutes into a powder.

The powder of 100 mg of the sample was put into a molding die of diameter 11 mm and an upper die of diameter 11 mm was mounted thereon, then heating was carried out at a temperature-rising rate of 2° C./sec until 600° C. while applying a load of 2 tons (pressure of 196 MPa) by a hydraulic press, followed by releasing the pressure and allowing to cool to room temperature, thereby obtaining a sample. The resulting sample was measured for a specific gravity using a micrometer, a direct reading balance, and a slide gauge and for an ion conductivity by a similar method to that of the second powder A.

TABLE 3

| | Constitution of electrolyte | Treatment temperature (° C.) | Density (g/cm³) | Ion conductivity (S/cm, 25° C.)** |
|---|---|---|---|---|
| Example 1 | Second powder A + First powder A (LICGC + LiPO₃) | 600 | 2.27 | $2.0 \times 10^{-5}$ |
| Comparative Example 1 | Second powder A (LICGC) | 600 | 1.86 | $5.8 \times 10^{-7}$ |
| Comparative Example 2 | Second powder A + First powder D (LICGC + SiO₂—TiO₂ type glass) | 600 | 2.13 | $8.7 \times 10^{-7}$ |

**The ion conductivity indicates a bulk ion conductivity without grain boundary resistivity.

TABLE 4

| | Configuration of electrolyte | Treatment temperature (° C.) | Ion conductivity (S/cm, 25° C.)** |
|---|---|---|---|
| Example 2 | Second powder B + First powder A (LZP + LiPO₃) | 600 | $4.3 \times 10^{-5}$ |

TABLE 4-continued

| | Configuration of electrolyte | Treatment temperature (° C.) | Ion conductivity (S/cm, 25° C.)** |
|---|---|---|---|
| Comparative Example 3 | Second powder B (LZP) | 600 | $1.1 \times 10^{-8}$ |
| Comparative Example 4 | Second powder B + First powder D (LZP + SiO₂—TiO₂ type glass) | 600 | $2.4 \times 10^{-8}$ |

**The ion conductivity indicates a bulk ion conductivity without grain boundary resistivity.

TABLE 5

| | Configuration of electrolyte | Treatment temperature (° C.) | Ion conductivity (S/cm, 25° C.)** |
|---|---|---|---|
| Example 3 | Second powder C + First powder A (LLZ + LiPO₃) | 600 | $2.1 \times 10^{-6}$ |
| Comparative Example 5 | Second powder C (LLZ) | 600 | $3.1 \times 10^{-7}$ |
| Comparative Example 6 | Second powder C + First powder D (LLZ + SiO₂—TiO₂ type glass) | 600 | $4.1 \times 10^{-7}$ |

**The ion conductivity indicates a bulk ion conductivity without grain boundary resistivity.

Example 4, Comparative Examples 7, 8

Preparation of Powder of Positive Electrode Layer

The powders of the first inorganic solid electrolyte and the second inorganic solid electrolyte, the positive electrode active material, and the conductive additive in Example 4, the powder of the second inorganic solid electrolyte, the positive electrode active material, and the conductive additive in Comparative Example 7, and a commercial available glass, the powder of the second inorganic solid electrolyte, and the positive electrode active material, and the conductive additive in Comparative Example 8 were respectively mixed to prepare powders of positive electrode layer.

These materials were blended in accordance with Table 6, to which then 0.3 gram of a dispersing agent (by BYK Japan KK., BYK, BYK190) and zirconia balls of diameter 5 mm were added, then these were mixed by a planetary centrifugal vacuum mixer (by Thinky Co., ARV-200) at 1000 rpm for 10 minutes and dried, followed by being milled by Labo Milser (by Iwatani Co., LM-PLUS) at 20000 rpm for 30 minutes into a powder. Here, $LiMn_2O_4$ (by Honjo Chemical Co.) was used as the positive electrode active material.

TABLE 6

| | Positive electrode active material | Second inorganic solid electrolyte | First inorganic solid electrolyte | Conductive additive |
|---|---|---|---|---|
| Example 4 | LiMn$_2$O$_4$ 1.25 g | Second powder B (LZP) 3 g | First powder A (LiPO$_3$) 0.25 g | Acetylene black 0.5 g |
| Comparative Example 7 | LiMn$_2$O$_4$ 1.25 g | Second powder B (LZP) 3 g | (Not contained) | Acetylene black 0.5 g |
| Comparative Example 8 | LiMn$_2$O$_4$ 1.25 g | Second powder B (LZP) 3 g | First powder D (L-TIM35) 0.25 g | Acetylene black 0.5 g |

Preparation of Powder of Negative Electrode Layer

The powders of the first inorganic solid electrolyte and the second inorganic solid electrolyte, the negative electrode active material, and the conductive additive in Example 4, the powder of the second inorganic solid electrolyte, the negative electrode active material, and the conductive additive in Comparative Example 7, and a commercial available glass, the powder of the second inorganic solid electrolyte, the negative electrode active material, and the conductive additive in Comparative Example 8 were respectively mixed to prepare powders of negative electrode layer.

These materials were blended in accordance with Table 7, to which then 10 grams of water, 0.3 gram of a dispersing agent (By BYK Japan KK., BYK, BYK190) and zirconia balls of diameter 5 mm were added, then these were mixed by a planetary centrifugal vacuum mixer (by Thinky Co., ARV-200) at 1000 rpm for 10 minutes and dried, followed by being milled by Labo Milser (by Iwatani Co., LM-PLUS) at 20000 rpm for 30 minutes into a powder. Here, TiO$_2$ (by Sakai Chemical Industry, Co., anatase) was used as the negative electrode active material.

TABLE 7

| | Negative electrode active material | Second inorganic solid electrolyte | First inorganic solid electrolyte | Conductive additive |
|---|---|---|---|---|
| Example 4 | TiO$_2$ 1.25 g | Second powder B (LZP) 3 g | First powder A (LiPO$_3$) 0.25 g | Acetylene black 0.5 g |
| Comparative Example 7 | TiO$_2$ 1.25 g | Second powder B (LZP) 3 g | (Not contained) | Acetylene black 0.5 g |
| Comparative Example 8 | TiO$_2$ 1.25 g | Second powder B (LZP) 3 g | First powder D (L-TIM35) 0.25 g | Acetylene black 0.5 g |

Preparation of Powder of Solid Electrolyte Layer

The powders of the first inorganic solid electrolyte and the second inorganic solid electrolyte in Example 4, only the powder of the second inorganic solid electrolyte in Comparative Example 7, and a commercial available glass and the powder of the second inorganic solid electrolyte in Comparative Example 8 were respectively mixed to prepare powders of negative electrode layer.

These materials were blended in accordance with Table 8, to which then 10 grams of water and zirconia balls of diameter 5 mm were added, then these were mixed by a planetary centrifugal vacuum mixer (by Thinky Co., ARV-200) at 1000 rpm for 10 minutes and dried, followed by being milled by Labo Milser (by Iwatani Co., LM-PLUS) at 20000 rpm for 30 minutes into a powder.

TABLE 8

| | Second inorganic solid electrolyte | First inorganic solid electrolyte |
|---|---|---|
| Example 4 | Second powder B (LZP) 3 g | First powder A (LiPO$_3$) 0.25 g |
| Comparative Example 7 | Second powder B (LZP) 3 g | (Not contained) |
| Comparative Example 8 | Second powder B (LZP) 3 g | First powder D (SiO$_2$—TiO$_2$ type glass) 0.25 g |

Preparation of All-Solid Secondary Battery

An all-solid secondary battery was prepared using the resulting powders of positive electrode layer, powders of negative electrode layer, and powders of solid electrode layer.

25 mg of a powder of negative electrode layer was inserted into a die of diameter 11 mm of a tableting device, then the surface of the powder was lightly compacted and flattened by a rod of diameter 11 mm. 50 mg of a powder of solid electrode layer was inserted thereon, the powder of solid electrode layer was leveled such that the pre-inserted powder of negative electrode layer was not deformed, then the surface was lightly compacted and flattened by a rod of diameter 11 mm. 25 mg of a powder of positive electrode layer was inserted thereon, the entire powders were leveled such that the pre-inserted powders of negative electrode layer and solid electrode layer were not deformed, then an upper die of diameter 11 mm was mounted thereon.

Heating was performed up to 600° C. while pressing the die of diameter 11 mm of a tableting device at a pressure of 2 tons by a hydraulic press, followed by releasing the pressure and allowing to cool to room temperature, thereby obtaining a sample of all-solid secondary battery.

(Evaluation of Sample)

The resulting sample was immediately put into a dry room with a dew point of −50° C. or lower, and a bulk density of the sample was measured from mass, thickness, and diameter of the sample. An energy density of battery was also calculated using the measured mass.

At this time, the sample was inserted into an aluminum laminate pack and evaluated after vacuum packing in order to avoid effects of moisture. Evaluation of electric conductivity inside or outside the laminate pack was performed by arranging a silver electrode at negative electrode side and aluminum at positive electrode side.

Figure 1:
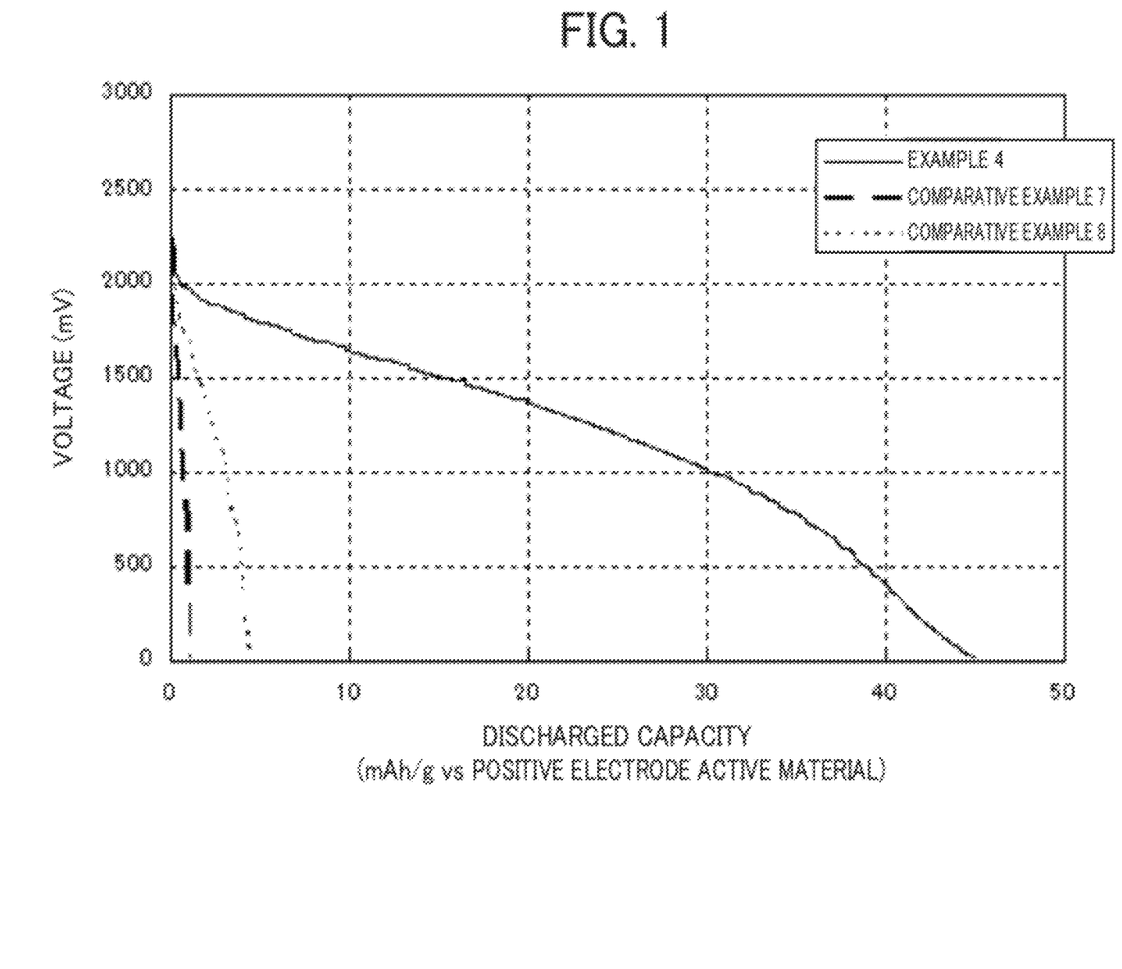
FIG. 1 is a graph showing discharged capacity of all-solid secondary batteries of examples of the present invention (Example 1) and Comparative Examples 1 and 2.
Figure 2:
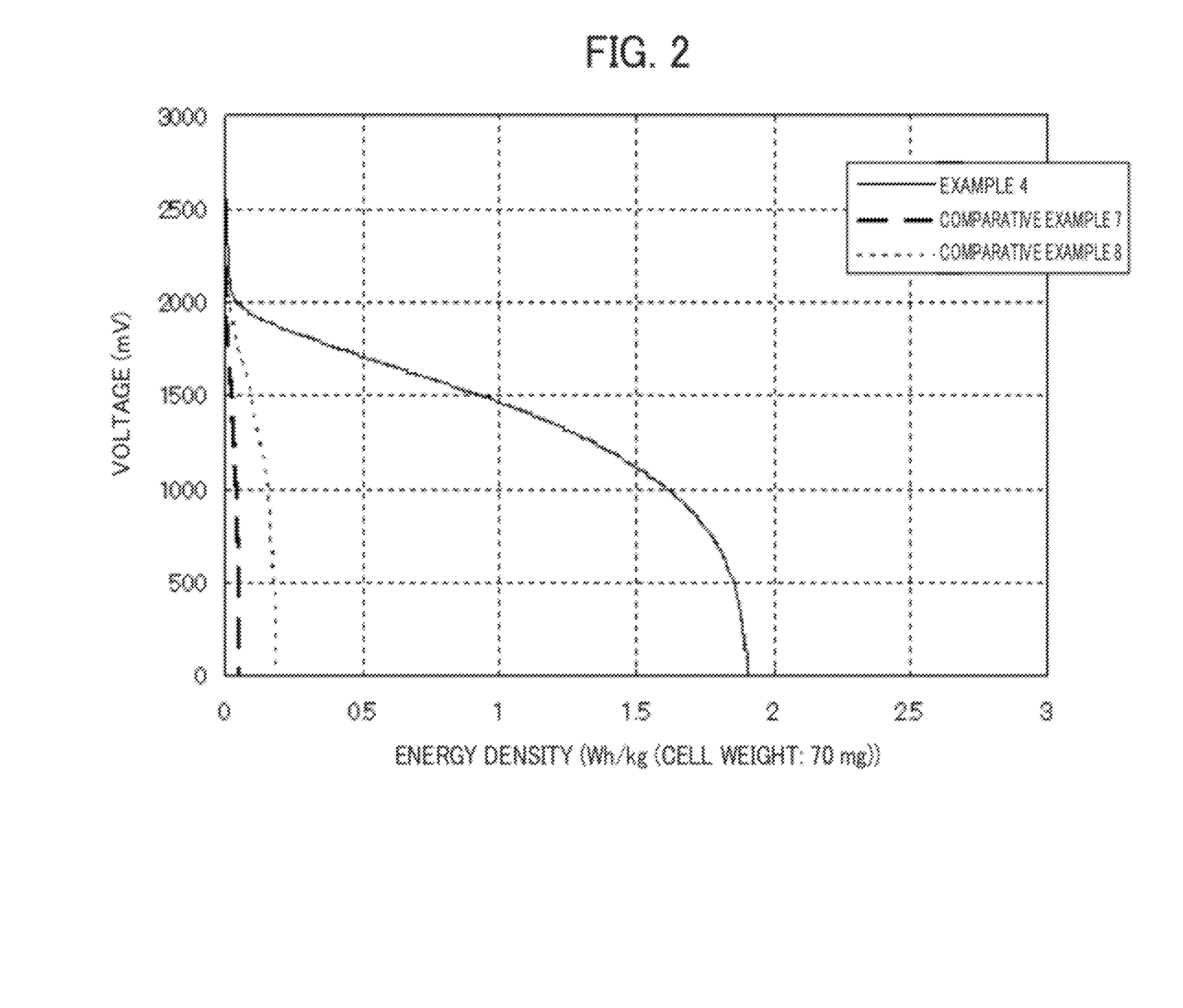
FIG. 2 is a graph showing energy density at the time of full charge of all-solid secondary batteries of examples of the present invention (Example 1) and Comparative Examples 1 and 2.

A charge-discharge test was performed in a constant-temperature bath at 60° C. A charge-discharge rate was set to 1/20 C, constant current charge was performed up to 4.5 V, and constant current discharge was performed after maintaining at an open circuit voltage for 2 minutes. At this time, cut-off voltage was set at 0.05 V. The results of the charge-discharge test are shown in Table 9, and FIGS. 1, 2.

TABLE 9

| | Discharged capacity (mAh/g) | Energy density (Wh/kg) | Specific gravity (g/cm$^3$) |
|---|---|---|---|
| Example 4 | 44.5 | 1.9 | 2.34 |
| Comparative Example 7 | 1.1 | <0.1 | 2.02 |

TABLE 9-continued

| | Discharged capacity (mAh/g) | Energy density (Wh/kg) | Specific gravity (g/cm³) |
|---|---|---|---|
| Comparative Example 8 | 4.4 | 0.2 | 2.32 |

The results demonstrate that the all-solid secondary battery in Example 4 has a discharged capacity of 10 mAh/g or higher, more specifically 30 mAh/g or high, thus has a high discharged capacity. On the other hand, the discharged capacity of the samples of Comparative Examples 7 and 8 was less than 10 mAh/h. It has therefore been demonstrated that the all-solid secondary battery in Examples of the present invention has a higher discharged capacity than those of Comparative Examples 7 and 8.

It has also been demonstrated that the all-solid secondary battery in Example 4 has an energy density of 0.5 Wh/kg or higher, more specifically 1.0 Wh/kg or high, thus has a high energy density. On the other hand, the energy density of the samples of Comparative Examples 7 and 8 was less than 0.5 Wh/kg. It has therefore been demonstrated that the all-solid secondary battery in Examples of the present invention has a higher energy density than those of Comparative Examples 7 and 8.

It has also been demonstrated the all-solid secondary battery in Example 4 has a specific gravity of 2.10 g/cm³ or higher, more specifically 2.34 g/cm³ or higher, thus has a high energy density. On the other hand, the specific gravity of the sample of Comparative Example 7 was 2.32 g/cm³. Additionally, the specific gravity of the sample of Comparative Example 8 was 2.10 g/cm³. It has therefore been demonstrated that the all-solid secondary battery in Examples of the present invention has a higher specific gravity than those of Comparative Examples 7 and 8.

The results described above demonstrate that the all-solid secondary battery in Examples of the present invention can achieve a high specific gravity, a high discharged capacity, and a high energy density by way of mixing a lithium ion conductive glass-ceramic and an ion conductive glass. The reason is estimated that the first inorganic solid electrolyte bridges the second inorganic solid electrolyte, the electrode active material, and the conductive additive, thereby the performance of the all-solid secondary battery is improved. It has also been demonstrated that specific gravity and energy density are increased even by adding a glass with no lithium ion conductivity to lithium ion conductive ceramics but are lower than those of Examples. The reason is estimated that interface resistance cannot be decreased since lithium ion conductivity does not increase as also shown in Example 1.

Figure 3A:
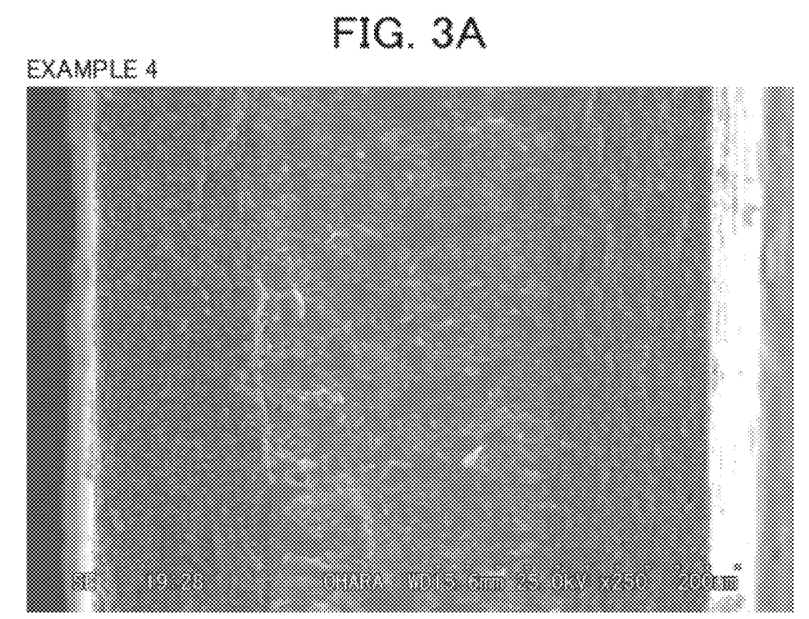
FIG. 3A and FIG. 3B show images of electron scanning microscope (SEM) at a cross-section of all-solid secondary batteries of Example 4 of the present invention and Comparative Example 7.
Figure 3B:
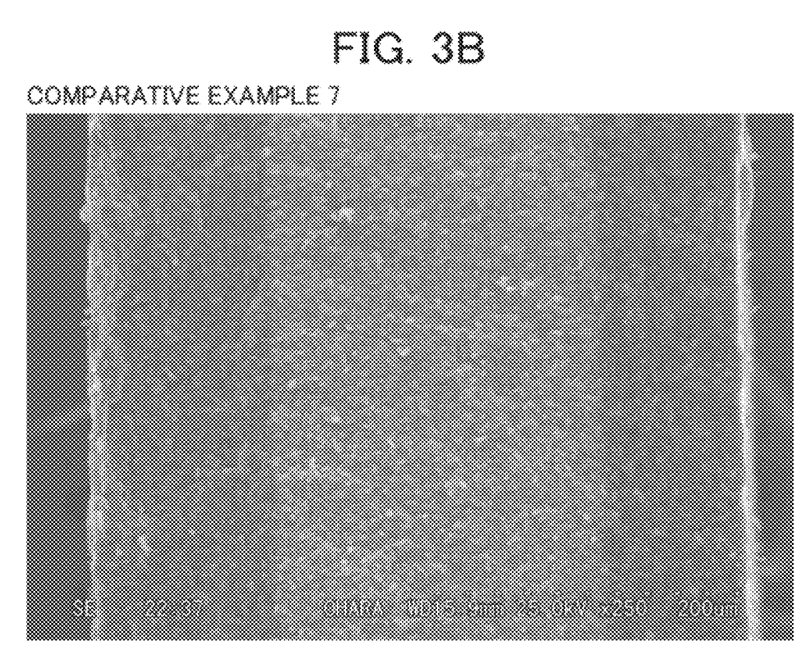

Furthermore, FIG. 3A and FIG. 3B show SEM images in Example 4 and Comparative Example 7. These images demonstrate that densification has further progressed in the all-solid secondary battery of Example 4 compared to the sample of Comparative Example 7.

Although embodiments of the present invention are explained in detail for the purpose of exemplification as above, the present invention is not limited to the embodiments. Those skilled in the art will make many modifications without departing from the spirit and scope of the present invention, and which are also encompassed by the present invention.

What is claimed is:

1. An all-solid secondary battery, comprising
a positive electrode layer and
a negative electrode layer
wherein the positive electrode layer is disposed on one side of a solid electrolyte layer, the negative electrode layer is disposed on the other side of the solid electrolyte layer,
wherein at least one of the positive electrode layer, the negative electrode layer, and the solid electrolyte layer comprises
a first inorganic solid electrolyte and
a second inorganic solid electrolyte,
the first inorganic solid electrolyte is amorphous and the content of transition metal is less than 15% by mass on oxide basis, and
said first inorganic solid electrolyte comprises the following components in terms of mass percent on oxide basis:
$R_2O$ 12-45%
$SiO_2$ 0-75%
$P_2O_5$ 0-83%
$AO_2$ 0-10%
$M_2O_3$ 0-20%;
and the second inorganic solid electrolyte comprises the following components in terms of mass percent on oxide basis:
$R_2O$ 3-20%
$AO_2$ 15-34% and
$ZrO_2$ 15% or more,
$SiO_2$ 0-10%,
$P_2O_5$ 0-60%,
$M_2O_3$ 0-60%
in which, R is at least one selected from Li and Na;
A is at least one selected from Zr, Ti, and Ge; and
M is at least one selected from B, Al, Bi, La, Y, and Sc,
and wherein said components of the second inorganic solid electrolyte has a NASICON-type, $\beta$-$Fe_2(SO_4)_3$-type, garnet-type, or perovskite-type crystal structure.

2. The all-solid secondary battery according to claim 1, wherein the content of the first inorganic solid electrolyte is 0.5% to 15% in terms of mass percent in the solid electrolyte layer.

3. The all-solid secondary battery according to claim 1, wherein the negative electrode layer comprises the first inorganic solid electrolyte, the second inorganic solid electrolyte, a negative electrode active material, and a conductive additive, and the content of the first inorganic solid electrolyte is 1% to 15% in terms of mass percent.

4. The all-solid secondary battery according to claim 1, wherein the positive electrode layer comprises the first inorganic solid electrolyte, the second inorganic solid electrolyte, a positive electrode active material, and a conductive additive, and the content of the first inorganic solid electrolyte is 1% to 15% in terms of mass percent.

5. The all-solid secondary battery according to claim 1, wherein the first inorganic solid electrolyte is composed of a composition same as that of a glass with a Tg of 250° C. or higher and 650° C. or lower.

6. The all-solid secondary battery according to claim 1, wherein the first inorganic solid electrolyte consists of amorphous $LiPO_3$.

7. The all-solid secondary battery according to claim 1, wherein the positive electrode active material in the positive electrode layer is composed of $LiMtO_2$ and/or $LiMt_2O_4$, in which Mt is at least one selected from Fe, Ni, Co, and Mn.

8. The all-solid secondary battery according to claim 1, wherein the negative electrode active material in the negative electrode layer is composed of $Li_4Ti_5O_{12}$ and/or $TiO_2$.

* * * * *